United States Patent [19]

Minato et al.

[11] Patent Number: 4,461,878

[45] Date of Patent: Jul. 24, 1984

[54] EPOXY RESIN HARDENING AGENTS

[75] Inventors: Ichiro Minato; Koichi Shibata, both of Hyogo; Itsuo Furuoya, Osaka, all of Japan

[73] Assignee: Takeda Chemical Industries, Ltd., Osaka, Japan

[21] Appl. No.: 546,522

[22] Filed: Oct. 28, 1983

Related U.S. Application Data

[62] Division of Ser. No. 322,206, Nov. 17, 1981.

[30] Foreign Application Priority Data

Nov. 28, 1980 [JP] Japan ................................ 55-168372

[51] Int. Cl.$^3$ ................................................ C08G 59/50

[52] U.S. Cl. .................................... 525/504; 528/122; 528/123; 528/361; 528/407

[58] Field of Search ................ 525/504; 528/122, 123, 528/361, 407

[56] References Cited

U.S. PATENT DOCUMENTS 3,327,016 6/1967 Lee .................................. 528/122 X
3,367,911 2/1968 Daum et al. ...................... 528/122 X
4,391,958 7/1983 Minato et al. .................. 528/122 X

*Primary Examiner*—Earl A. Nielsen
*Attorney, Agent, or Firm*—Antonelli, Terry & Wands

[57] ABSTRACT

Disclosure is a novel hardening agent for epoxy resins which has quick cold hardening ability and high safety for human bodies. This hardening agent has the general formula:

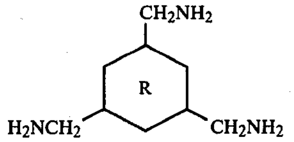

(wherein 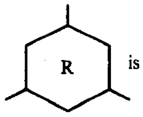 is 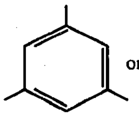 or 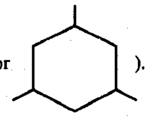 ).

Epoxy resins hardened with this hardening agent have excellent mechanical properties at high temperatures.

4 Claims, No Drawings

EPOXY RESIN HARDENING AGENTS

This is a division of application Ser. No. 322,206, filed Nov. 17, 1981.

The present invention relates to novel epoxy resin hardening agents. More particularly, it relates to epoxy resin hardening agents which have rapid cold hardening ability and high safety and which provide hardened products excellent in heat resistance.

Hitherto, aliphatic polyamines such as diethylenetriamine, triethylenetetramine, xylylenediamine, etc. have been generally used as rapid hardening agents for epoxy resins. The products hardened with these amines have some heat resistance, but mechanical properties of such products especially at high temperatures such as 120° C. or higher are not necessarily satisfactory. Moreover, these amines have problems on safety to human bodies because they have relatively higher vapor pressures. Therefore, use of modified amines have been proposed, but these modified amines are liable to further decrease mechanical properties of the hardened products at high temperatures. Aromatic polyamines such as m-phenylenediamine, diaminodiphenylmethane, diaminodiphenyl sulfone, etc. provide hardened products excellent in mechanical properties at high temperatures, so that they are industrially widely used, but they have the defect that they cannot harden epoxy resins at normal temperatures.

The present inventors earnestly studied epoxy resin hardening agents and succeeded in finding that 1,3,5-tris-(aminomethyl)benzene (sometimes referred to as "MTA" hereinafter) and 1,3,5-tris(aminomethyl)cyclohexane (sometimes referred to as "$H_6$MTA" hereinafter) per se have extremely lower vapor pressures and so are high in safety, have rapid cold hardening ability and provide hardened products extremely excellent in mechanical properties at high temperatures.

That is, the present invention provides epoxy resin hardening agents represented by the general formula [I]:

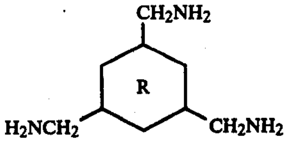

(wherein 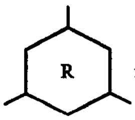 represents 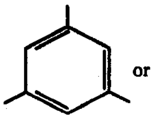 or

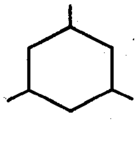 ).

The MTA and $H_6$MTA which are the hardening agents of the present invention are novel polyamines obtained by the methods disclosed in Japanese Patent Applications No. 67169/79 and No. 67170/79. That is, MTA can be produced by reducing, in the presence of a catalyst such as Raney nickel, a starting material of 1,3,5-tricyanobenzene obtained by ammoxydation of mesitylene. $H_6$MTA can be produced by further reducing aromatic ring of the MTA in the presence of a reducing catalyst. Moreover, $H_6$MTA can also be obtained directly from 1,3,5-tricyanobenzene by reducing cyano groups and aromatic ring at once.

Thus obtained $H_6$MTA includes both the cis and trans types and cis type is thermally stabler than trans type. Therefore, $H_6$MTA high in proportion of cis type is preferred and the proportion of the cis type is preferably at least 60 mol.%.

Epoxy resins to which these MTA and $H_6$MTA hardening agents can be applied include polyepoxide compounds having at least average one epoxy group per one molecule, for instance, various general-purpose epoxy resins. Examples of these known epoxy resins are those of bisphenol A type, bisphenol F type, hydrogenated bisphenol A and F types, alicyclic type, novolak type, polyoxyalkylene type, polyhydroxybenzene type, methylepichlorohydrin type, glycidylamine type, epoxy resins derived from dimer acid, phthalic acid, tetrahydrophthalic acid or p-oxybenzoic acid and epichlorohydrin, halogen-containing epoxy resins, etc.

These MTA and $H_6$MTA hardening agents may be used alone or in admixture and moreover may also be used in combination with other known hardening agents. For example, the hardening agents of the present invention may be used in combination with aliphatic or aromatic polyamines and various modified products thereof, polyamides, imidazoles, mercaptans, phenols, various acid anhydrides, $BF_3$ complex compounds, etc. Furthermore, MTA and $H_6$MTA may be modified with organic acids, epoxy compounds, etc. Moreover, prepolymers having diamines at both terminals may also be used as hardening agents. Such prepolymers can be obtained by modifying MTA or $H_6$MTA with any epoxy resin. For example, one mole of diglycidyl ether of bisphenol A is reacted with two or more moles of MTA or $H_6$MTA to obtain a prepolymer.

The hardening agents of the present invention may be added to epoxy resins as they are or may be dissolved in a solvent such as toluene and then added as a solution to epoxy resins. The hardening time may be suitably adjusted according to such way of addition.

If necessary, various additives may also be added. For example, there may be added inorganic fillers such as metal powder, silica, zinc oxide, titanium oxide, magnesium oxide, calcium oxide, calcium carbonate, aluminum sulfate, talc, clay, alumina white, barium sulfate, calcium sulfate, pumice powder, asbestos, diatomaceous earth, glass fiber, mica, molybdenum disulfide, carbon black, graphite, lithopone, etc., phenolic resins, petroleum resins, phthalic esters, other various pigments, etc.

The triamine hardening agents of the present invention may be used in an amount of 0.1–2 times, preferably 0.5–1.5 times the number of amine equivalent of the triamine divided by epoxy equivalent.

Epoxy resins hardened with the hardening agents of the present invention exhibit extremely high heat distortion temperatures. Furthermore, vapor pressure of the hardening agents per se is, for example, about 1/20 (20° C.) of m-xylylenediamine which is the ordinarily used hardening agent so that the hardening agents of the present invention are very useful hardening agents with high safety.

The epoxy resins hardened with the hardening agents of the present invention may be effectively used as, for example, paints, adhesives, case materials, coating agents, electrical insulating materials, etc. like the conventional epoxy resins.

REFERENCE EXAMPLE 1

Preparation of 1,3,5-tricyanobenzene 18.2 parts of vanadium pentoxide was added to 150 parts of a 33% aqueous solution of oxalic acid and the mixture was heated to about 100° C. on a water bath to dissolve vanadium pentoxide. The solution was referred to as solution A. A solution obtained by dissolving 20 parts of chromium oxide (VI) in 150 parts of a 33% aqueous solution of oxalic acid as mentioned above was referred to as solution B. Solutions A and B were homogeneously mixed.

To this mixed solution was added 300 parts of anatase type titanium oxide powder burned at 800° C. and water was evaporated while they were mixed. Thus obtained wet slurry was molded by extruder into a cylindrical shape having a diameter of 4 mm and a length of 5 mm. The resulting molded products were dried at 100° C. for 15 hours and thereafter burned at 500° C. for 4 hours in air to obtain a catalyst.

About 200 ml of thus obtained catalyst was packed in an ordinary fixed bed reactor and a mixed gas consisting of 0.5 mol.% of mesitylene, 7 mol.% of ammonia and 92.5 mol.% of air was reacted under normal pressure at a space velocity of 1000 $hr^{-1}$ (at normal temperature and pressure) while maintaining the temperature of medium in bath at 360° C. to obtain 1,3,5-tricyanobenzene (MTN) in a yield of 51.2 mol.%.

REFERENCE EXAMPLE 2

Preparation of 1,3,5-tris(aminomethyl)benzene 1000 g of 1,3,5-tricyanobenzene (MTN) was charged in an autoclave having a 20 l capacity together with 400 g of Raney nickel-chromium catalyst (atomic ratio Ni:Cr=49:1), 1800 ml of methanol, 4.2 l of m-xylene and 32.6 g of sodium hydroxide. Hydrogen was injected thereinto under an initial pressure of 140 $kg/cm^2G$ and reaction was effected at 60°-102° C. to cause absorption of nearly theoretical amount of hydrogen for 31 minutes. The catalyst was filtered off and the solvent was distilled out. Then, distillation under reduced pressure was effected to obtain 874 g of colorless crystal of 1,3,5-tris(aminomethyl)benzene (MTA). The product had a melting point of 49°-51° C. and a boiling point of 136°-139° C./0.4 mmHg.

REFERENCE EXAMPLE 3

Preparation of 1,3,5-tris(aminomethyl)cyclohexane 200 g of 1,3,5-tris(aminomethyl)benzene (MTA) obtained in Reference Example 2 together with 15 g of 5% ruthenium-alumina catalyst (manufactured by Japan Engelhard Co., Ltd.), 100 g of water and 2 g of sodium hydroxide were charged into a magnetically stirring type autoclave having a 1 l capacity. High pressure hydrogen was injected thereinto under an initial pressure of 120 $kg/cm^2G$ and reaction was effected at 110°-135° C. for 3.5 hours to cause absorption of 3.8 mols of hydrogen.

The catalyst was filtered off and the solvent was distilled out. Thereafter, distillation under reduced pressure was carried out to obtain 164 g of 1,3,5-tris-(aminomethyl)cyclohexane ($H_6MTA$), about 85 mol.% of which was cis type. This $H_6MTA$ was colorless and transparent liquid of low viscosity which had a boiling point of 127°-128° C./1 mmHg.

EXAMPLE 1

Each of 100 g of bisphenol A type epoxy resin (Trade name Epikote 828) having an epoxy equivalent of 188.7 and 87.5 g of MTA was heated to 60° C. and they were quickly mixed. To this mixture was further added 500 g of bisphenol A type epoxy resin of room temperature and they were intimately mixed. Thereafter, the mixture was deaerated under reduced pressure of 10 mmHg, then subjected to procedures necessary for ordinary casting and poured into a mold. After about 21 minutes, heat was abruptly generated and a slighly yellow transparent cast plate was obtained. Properties of thus obtained cast plate are shown in Table 1.

EXAMPLE 2

To 600 g of the same epoxy resin as used in Example 1 was added 90.8 g of $H_6MTA$ and they were homogeneously mixed. Then, the mixture was cast in accordance with usual procedures. In about 25 minutes after casting, heat generation occurred and colorless and transparent cast plate was obtained. Properties of thus obtained cast plate are shown in Table 1.

COMPARATIVE EXAMPLE 1

600 g of the same epoxy resin as used in Example 1 was mixed with 108.2 g of xylylenediamine (XDA) and the mixture was cast in the same manner as in Example 2. After about 75 minutes, the mixture was hardened with generation of heat to obtain a slightly yellow cast plate.

COMPARATIVE EXAMPLE 2

Casting was effected in the same manner as in Comparative Example 1 except that XDA was substituted by 113.0 g of bis(aminomethyl)cyclohexane ($H_6XDA$). After about 83 minutes, the mixture was hardened with generation of heat to obtain a colorless and transparent cast plate.

TABLE 1

| | After-cure* conditions | Bending strength (ASTM D-790) Kgf/mm² | Elastic modulus ($Kgf/mm^2$) | Heat distortion temperature (°C.) (ASTM D-648) |
|---|---|---|---|---|
| Example 1 | (A) | 14.22 | 341 | 141 |
| | (A)+(B) | — | — | 147 |
| | (C) | — | — | 161 |
| Example 2 | (A) | 13.21 | 324 | 152 |
| | (A)+(B) | — | — | 167 |
| | (C) | — | — | 182 |
| Comparative Example 1 | (A) | 14.07 | 318 | 112 |
| | (A)+(B) | — | — | 112 |
| Comparative Example 2 | (A) | 14.40 | 305 | 125 |
| | (A)+(B) | — | — | 132 |

*After-cure conditions
(A): 60 hours at room temperature and subsequently 3 hours at 120° C.
(B): 3 hours at 200° C.
(A)+(B): First under the condition (A) and then under the condition (B).
(C): 15 hours at room temperature and then after-cured for 3 hours at 120° C. and furthermore for 6 hours at 200° C.

EXAMPLE 3

Preparation of prepolymer

To 10 g of Epikote 828 (having an epoxy equivalent of 187.6) was added 14.7 g of 1,3,5-tris(aminomethyl)- benzene (MTA) and they were reacted at 70° C. for 3 hours to obtain a prepolymer which had a viscosity of 17,000 poises at 25° C.

The yellowish cast plate was obtained by mixing 50 g of Epikote 828 with 13.7 g of the prepolymer.

We claim:

1. A method for hardening epoxy resin which comprises mixing the epoxy resin with a hardening agent represented by the general formula:

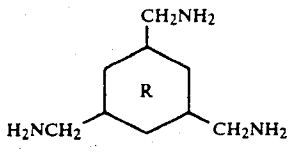

wherein 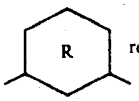 represents

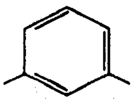 or 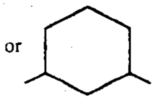

in an amount of 0.1–2 times the number of amine equivalent of the triamine divided by epoxy equivalent and, thereafter, allowing the resulting admixture to stand until an exothermic reaction occurs and the admixture is hardened.

2. A method for hardening an epoxy resin according to claim 1, wherein in

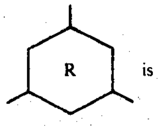 is 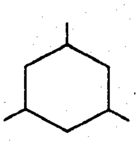.

3. A method for hardening an epoxy resin according to claim 1, wherein the

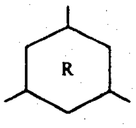 is 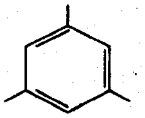.

4. A method for hardening an epoxy resin which comprises mixing the epoxy resin with a hardening agent which comprises a prepolymer obtained by reacting a compound represented by the general formula:

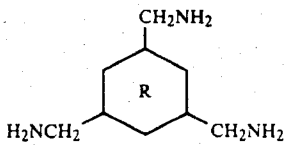

wherein 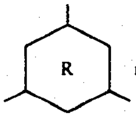 represents 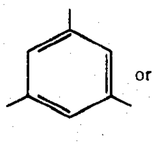 or

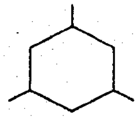

with an epoxy resin and, thereafter, allowing the admixture of the epoxy resin and the prepolymer to stand until exothermic reaction occurs and the admixture is hardened.

* * * * *